(12) United States Patent
Henry et al.

(10) Patent No.: US 8,827,598 B2
(45) Date of Patent: Sep. 9, 2014

(54) CUTTING ASSEMBLY WITH ENHANCED COOLANT DELIVERY

(75) Inventors: Nicholas Joseph Henry, Latrobe, PA (US); Kent Peter Mizgalski, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 251 days.

(21) Appl. No.: 13/302,581

(22) Filed: Nov. 22, 2011

(65) Prior Publication Data

US 2013/0129428 A1    May 23, 2013

(51) Int. Cl.
*B23B 27/10* (2006.01)
*B23B 27/04* (2006.01)
*B23B 29/04* (2006.01)

(52) U.S. Cl.
CPC ............... *B23B 27/04* (2013.01); *B23B 29/043* (2013.01); *B23B 27/10* (2013.01); *B23B 2250/12* (2013.01); *B23B 2200/086* (2013.01)
USPC ............................................ 407/11; 407/117

(58) Field of Classification Search
CPC ...... B23B 27/10; B23B 2250/12; B23B 27/04
USPC .............................. 407/11, 107, 108, 113, 117
See application file for complete search history.

(56) References Cited

U.S. PATENT DOCUMENTS

| | | | |
|---|---|---|---|
| 3,844,008 A | 10/1974 | Sletten | |
| 3,889,520 A | 6/1975 | Stoferle et al. | |
| 4,621,547 A | 11/1986 | Yankoff | |
| 4,848,198 A | 7/1989 | Royal et al. | |
| 5,112,164 A | 5/1992 | Pano | |
| 5,272,945 A | 12/1993 | Lockard | |
| 5,340,242 A | 8/1994 | Armbrust et al. | |
| 5,439,327 A | 8/1995 | Wertheim | |
| 5,709,508 A | 1/1998 | Barazani et al. | |
| 5,718,156 A | 2/1998 | Lagrolet et al. | |
| 5,833,403 A | 11/1998 | Barazani | |
| 5,901,623 A * | 5/1999 | Hong | 82/50 |
| 5,931,613 A | 8/1999 | Larsson | |
| 6,045,300 A | 4/2000 | Antoun | |
| 6,186,704 B1 | 2/2001 | Hale | |
| 6,299,388 B1 | 10/2001 | Slabe | |
| 6,312,199 B1 | 11/2001 | Sjödén et al. | |

(Continued)

FOREIGN PATENT DOCUMENTS

DE    3434653    4/1985
DE    20 2012 004 900 U1    5/2012

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

A toolholder has a head portion including a slot separating the head portion into a lower extension with a lower seat and an upper extension with an upper seat to retain a cutting insert. The head portion contains a coolant entrance passage, which receives coolant from a coolant source, and a coolant delivery passage, which discharges coolant toward a cutting insert. The cutting insert includes a top surface with an upwardly extending protuberance that can be engaged by the toolholder to rigidly mount the cutting insert in the head portion of the toolholder. The cutting insert further includes a coolant channel formed in the top surface of the cutting insert that is positioned directly opposite of the coolant discharge to enhance the flow rate of the coolant delivered to the cutting insert-workpiece interface.

11 Claims, 5 Drawing Sheets

(56) References Cited

U.S. PATENT DOCUMENTS

| | | |
|---|---|---|
| 6,471,448 B1 | 10/2002 | Lagerberg |
| 6,652,200 B2 * | 11/2003 | Kraemer ..................... 407/11 |
| 7,252,024 B2 | 8/2007 | Zurecki et al. |
| 7,273,331 B2 | 9/2007 | Giannetti |
| 7,568,864 B2 * | 8/2009 | Sjoo ........................... 407/11 |
| 7,883,300 B1 | 2/2011 | Simpson, III et al. |
| 7,896,585 B2 * | 3/2011 | Hecht ......................... 407/110 |
| 7,914,240 B2 * | 3/2011 | Baker et al. ................ 407/11 |
| 7,934,891 B2 | 5/2011 | Jonsson et al. |
| 8,142,112 B2 * | 3/2012 | Prichard et al. ............ 407/11 |
| 8,388,268 B2 * | 3/2013 | Henry et al. ................ 407/11 |
| 8,454,274 B2 * | 6/2013 | Chen et al. ................. 407/11 |
| 8,734,062 B2 * | 5/2014 | Henry et al. ................ 407/11 |
| 2003/0082018 A1 * | 5/2003 | Kraemer ..................... 407/11 |
| 2004/0240949 A1 * | 12/2004 | Pachao-Morbitzer et al. . 407/11 |
| 2006/0263153 A1 * | 11/2006 | Isaksson .................... 407/113 |
| 2007/0283794 A1 | 12/2007 | Giannetti |
| 2007/0286689 A1 * | 12/2007 | Giannetti .................... 407/11 |
| 2008/0124180 A1 | 5/2008 | Breisch |
| 2008/0131215 A1 | 6/2008 | Sjoo |
| 2010/0175519 A1 | 7/2010 | Deschenaux et al. |
| 2010/0196105 A1 | 8/2010 | Amstibovitsky et al. |
| 2011/0070037 A1 * | 3/2011 | Baker et al. ................ 407/11 |
| 2011/0299944 A1 * | 12/2011 | Hofermann .................. 407/11 |
| 2011/0311323 A1 | 12/2011 | Hecht |
| 2013/0202372 A1 * | 8/2013 | Hecht ......................... 407/107 |
| 2013/0236256 A1 * | 9/2013 | Kaufmann et al. .......... 407/107 |
| 2014/0147219 A1 * | 5/2014 | Kaufmann et al. .......... 407/11 |

FOREIGN PATENT DOCUMENTS

| | | | |
|---|---|---|---|
| EP | 1524053 | | 4/2005 |
| JP | 2000225540 | | 8/2000 |
| JP | 2007044834 A | * | 2/2007 |
| WO | 02096598 A1 | | 12/2002 |
| WO | 2009141815 A1 | | 11/2009 |

* cited by examiner

CUTTING ASSEMBLY WITH ENHANCED COOLANT DELIVERY

BACKGROUND OF THE INVENTION

The invention pertains to a cutting assembly for removing material from a workpiece. More specifically, the invention pertains to such a cutting assembly that includes a toolholder, which carries a cutting insert, wherein the toolholder provides the capability to supply coolant to the cutting insert.

In a cutting operation, such as, for example, a grooving operation, a grooving or cutting insert engages a workpiece so as to remove material from the workpiece. In some cutting assemblies, an upper seat and a lower seat retain the cutting insert. Exemplary cutting assemblies wherein an upper seat and a lower seat retain a cutting insert are shown in U.S. Pat. No. 6,261,032 and PCT Patent Application Publication WO 2009/141815 A1.

Material removal operations can generate heat at the interface between the cutting insert and the workpiece. Typically, it is advantageous to provide coolant to the vicinity of the interface between the cutting insert and the workpiece. The following patent documents are exemplary of arrangements that delivery coolant to the vicinity of a cutting insert: U.S. Pat. No. 5,439,327; U.S. Pat. No. 5,775,854; U.S. Pat. No. 6,705,805; and U.S. Pat. No. 7,641,422.

Even though the arrangements disclosed in some of the above patent documents deliver coolant, it remains highly desirable to provide a cutting assembly that delivers in an efficient fashion coolant to the interface between the cutting insert and the workpiece. This is especially true for a cutting operation in which the cutting insert engages the workpiece surface at the outside diameter (i.e., outside workpiece surface) for the purpose of cutting a groove. During the cutting operation, as the depth of the groove increases, the difficulty connected with coolant delivery to the cutting insert-workpiece interface increases. As can be appreciated, it would very beneficial to provide a cutting assembly (and especially a toolholder) that delivers coolant to the cutting insert-workpiece interface even as the depth of the groove increases during the cutting operation.

SUMMARY OF THE INVENTION

The inventors have solved the problem of delivering coolant to the cutting insert-workpiece interface by providing a coolant channel formed in the shank portion of the cutting insert. More specifically, the coolant channel is formed in a protuberance on the top surface of the cutting insert that is directly opposite the coolant discharge of the toolholder. The coolant channel acts as a nozzle to enhance the flow rate of coolant to the cutting insert-workpiece interface.

In one aspect, the invention is a cutting assembly comprising a toolholder and a cutting insert. The toolholder has an axial forward end and an axial rearward end, the toolholder having a head portion at the axial forward end and a shank portion at the axial rearward end. The head portion contains a slot separating the head portion into a lower section and an upper section, the lower section defining a lower seat and the upper section adapted to retain the cutting insert therebetween. The head portion contains a coolant entrance passage in fluid communication with a fastener bore, and the head portion containing a coolant delivery passage in fluid communication with the fastener bore, and the coolant delivery passage having an exit adapted to direct coolant to the cutting insert. The cutting insert includes a top surface with an upwardly extending protuberance that can be engaged by the toolholder to rigidly mount the cutting insert in the head portion of the toolholder. The cutting insert further includes a coolant channel formed in the top surface of the cutting insert, wherein the coolant channel is positioned directly opposite of the exit when mounted in the toolholder, thereby causing the channel to act as a nozzle to enhance the flow rate of the coolant delivered to an interface between the cutting insert and a workpiece.

In another aspect, the invention is a cutting assembly for removing material from a workpiece having a workpiece surface upon the cutting assembly engaging the workpiece at a cutting insert-workpiece interface. The assembly comprises a toolholder and an elongate cutting insert, the elongate cutting insert having a central longitudinal cutting insert axis wherein the central longitudinal cutting insert axis being generally perpendicular to the workpiece surface. The toolholder has an axial forward end and an axial rearward end, the toolholder having a head portion at the axial forward end and a shank portion at the axial rearward end. The head portion has a narrow axial forward extension having a central longitudinal extension axis. The head portion contains a slot separating the narrow axial forward extension into a lower axial forward extension section and an upper axial forward extension section wherein the upper axial forward extension section is movable relative to the lower axial forward extension section. The lower axial forward extension section defines a lower seat and the upper axial forward extension section defining an upper seat wherein the lower seat and the upper seat being adapted to retain the elongate cutting insert there between such that the central longitudinal cutting insert axis being generally parallel with the central longitudinal extension axis. The head portion contains a fastener bore. The head portion contains a coolant entrance passage in fluid communication with the fastener bore, and the upper axial forward extension section contains at least a portion of a coolant discharging section having a longitudinal coolant discharge axis. A fastener is received within the fastener bore, and the fastener has an axial fastener bore with an inlet and an outlet, the axial fastener bore inlet being in fluid communication with the coolant entrance passage and the axial fastener bore outlet being in fluid communication with the fastener bore. The coolant discharging section is in fluid communication with the fastener bore, and the coolant discharging section has an exit in the upper axial forward extension section wherein the exit opens towards the cutting insert-workpiece interface so as to discharge coolant towards the cutting insert in a direction generally parallel to the central longitudinal cutting insert axis. The cutting insert includes a top surface with an upwardly extending protuberance that can be engaged by the toolholder to rigidly mount the cutting insert in the head portion of the toolholder. The cutting insert further includes a coolant channel formed in the top surface of the cutting insert, wherein the coolant channel is positioned directly opposite of the exit when mounted in the toolholder, thereby causing the channel to act as a nozzle to enhance the flow rate of the coolant delivered to an interface between the cutting insert and a workpiece.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring to the drawings wherein like reference characters designate like elements there is shown a cutting assembly generally designated as 20. The specific kind of cutting assembly 20 illustrated is a grooving assembly. The illustration of a grooving assembly is not intended to restrict the scope of the invention. Further, the mention of the cutting assembly and cutting insert as a grooving assembly and grooving insert is not intended to restrict the scope of the invention. The kinds of cutting assemblies to which the invention relates includes, without limitation, a turning assembly, a cut-off tool assembly, and a face grooving assembly. The true scope and spirit of the invention is indicated by the claims hereof.

Figure 7:
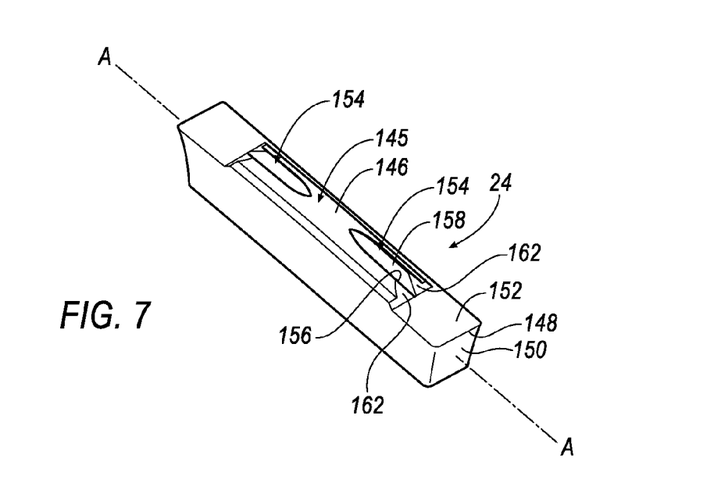
FIG. 7 is an isometric view of the cutting insert according to an embodiment of the invention.

Cutting (or grooving) assembly 20 comprises a toolholder 22 and a cutting insert (or grooving insert) 24. As shown in FIG. 7, the cutting insert 24 has a central longitudinal cutting insert axis A-A. The cutting insert 24 is secured in the toolholder 22 such that the central longitudinal cutting insert axis A-A is generally perpendicular to the workpiece surface (not shown). The toolholder 22 has an axial forward end 28 and an axial rearward end 30. The toolholder 22 has a shank portion 32 at the axial rearward end 30 and a head portion 34 at the axial forward end 28.

The head portion 34 contains a slot 36. The slot 36 divides the head portion 34 into an upper section (see bracket 40) and a lower section (see bracket 42). The head portion 34 has a narrow (or thin) axial forward extension 44, which has a central longitudinal extension axis B-B (see FIG. 1). The narrow axial forward extension 44 forms a lower axial forward extension 44A and an upper axial forward extension 44B. The slot 36 separates the lower axial forward extension 44A and the upper axial forward extension 44B so they are movable relative to one another. The upper section 40 (in the form of the upper axial forward extension 44B) has an upper seat 46 in the vicinity of the axial forward extension 44. The lower section 42 (in the form of the lower axial forward extension 44A) has a lower seat 48 in the vicinity of the axial forward extension 44. The upper seat 46 and the lower seat 48 comprise a seating region generally designated as 50.

Figure 2:
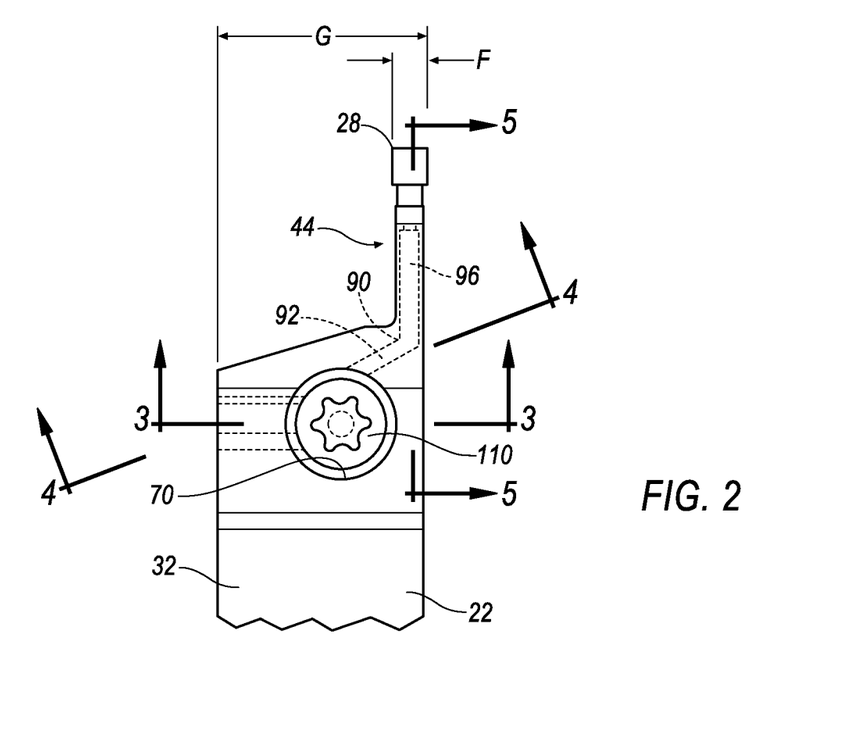
FIG. 2 is a top view of the head portion of the toolholder of FIG. 1.

The head portion 34 has a maximum transverse dimension "G" as shown in FIG. 2. The narrow axial forward extension 44 has a transverse dimension "F" as shown in FIG. 2. As shown in FIG. 2, the ratio (F/G) of the transverse dimension of the narrow axial forward extension to the maximum transverse dimension of the head portion is about 0.16. The ratio (F/G) of the transverse dimension of the narrow axial forward extension to the maximum transverse dimension of the head portion ranges between about 0.15 and about 0.50. In an alternate range, the range of F/G is between about 0.25 and about 0.40.

Figure 1:
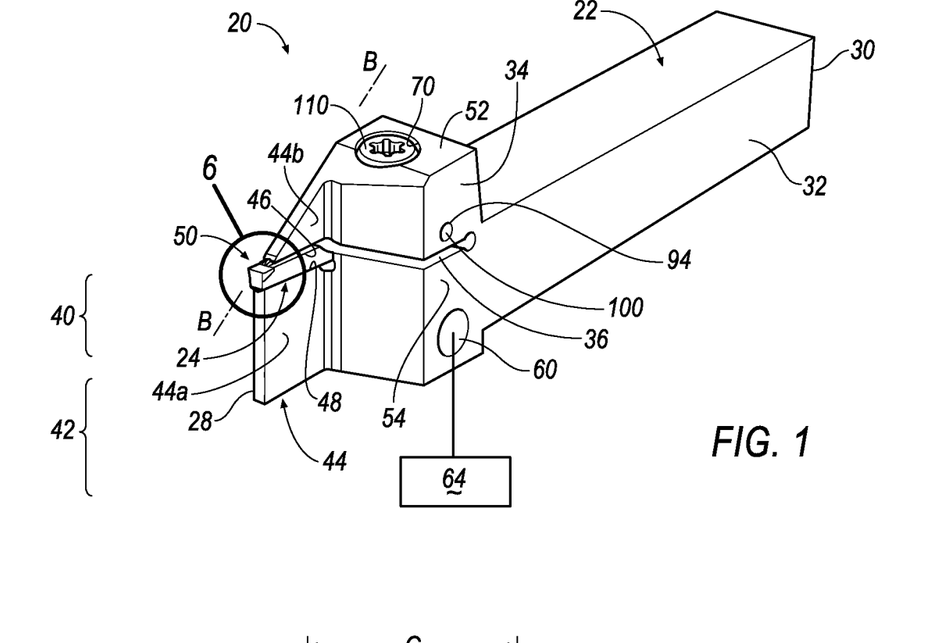
FIG. 1 is an isometric view of the cutting assembly, which has the toolholder and a cutting insert retained by the toolholder.

The head portion 34 has a top surface 52 and a selected side surface 54, which is visible in a drawing such as FIG. 1.

As will be described hereinafter, the coolant is delivered to the vicinity of the cutting insert-workpiece interface by discharging coolant from an opening in the narrow axial forward extension 44 of the head portion 34. Advantages result from discharging coolant directly at the cutting insert-workpiece interface throughout the entire cutting operation.

Figure 3:
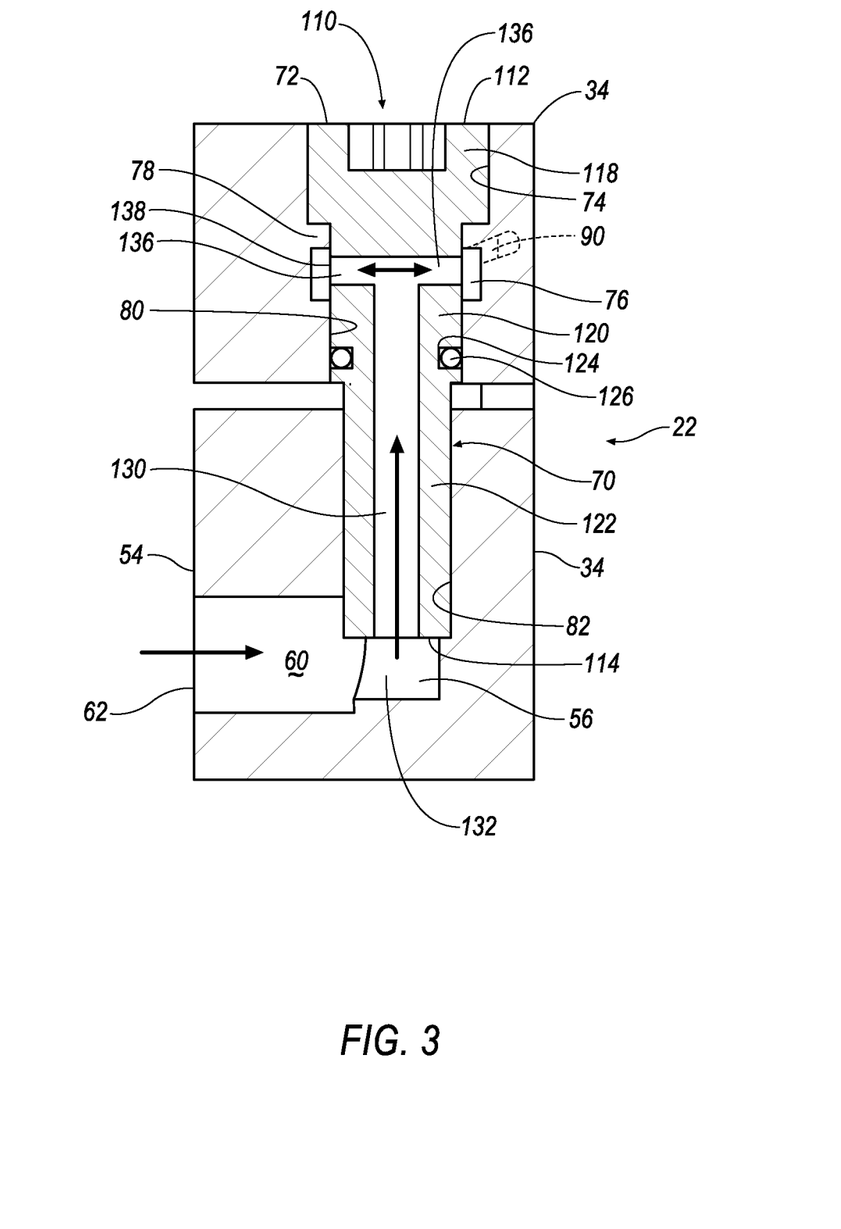
FIG. 3 is cross-sectional view of the head portion of the toolholder of FIG. 1 taken along section line 3-3 of FIG. 2.

Referring to FIG. 1 and FIG. 3, the head portion 34 contains a coolant entrance passage 60, which has an entrance opening 62 in the one side surface 54. As shown in FIG. 3, the coolant entrance passage 60 extends from the entrance opening 62 into the interior of the head portion 34. In particular, the coolant entrance passage 60 extends into the lower section 42 of the head portion 34, and it terminates in the interior of the lower section 42. The entrance opening 62 is in fluid communication with a source of coolant 64, which is shown in schematic, wherein the coolant source typically is under pressure.

The head portion 34 also contains a fastener bore 70, which has an open end 72 at the top surface 52 and extends into the interior of the head portion 34. The fastener bore 70 intersects the coolant entrance passage 60 wherein the region of intersection has the designation 56. It is in the region of intersection 56 that the fastener bore 70 terminates.

In reference to the geometry of the fastener bore 70 and in particular looking at FIG. 3, the fastener bore 70 has a counter bore section 74 adjacent to the open end 72. The fastener bore 70 further has a coolant reservoir section 76 wherein an annular shoulder 78 separates the counter bore section 74 from the coolant reservoir section 76. The fastener bore 70 further has an upper terminal bore section 80, which extends from the coolant reservoir section 76 to the slot 36. The fastener bore 70 further has a lower bore section 82 that extends from the slot 36 and terminates in the lower section 42 of the head portion 34 of the grooving toolholder 22. The lower bore section 82 terminates in such a fashion that it intersects the coolant entrance passage 60 in the intersection region 56. This intersection places the lower bore section 82 in fluid communication with the coolant entrance passage 60.

Figure 4:
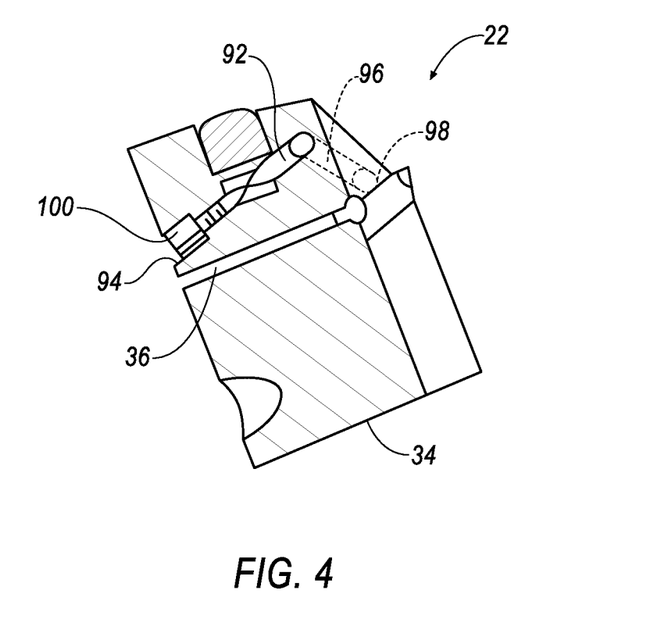
FIG. 4 is cross-sectional view of the head portion of the toolholder of FIG. 1 taken along section line 4-4 of FIG. 2.

Referring to FIGS. 3 and 4, the upper section 40 of the head portion 34 contains a coolant delivery passage 90, which has a receiving section 92. The receiving section 92 has a generally transverse orientation and has an opening 94 at the one surface 54 of the head portion 34. A plug 100 (or the like) stops up the receiving section 92 at the opening 94. The receiving section 92 of the coolant delivery passage 90 travels from the opening 94 past the fastener bore 70 in such an orientation to intersect the coolant reservoir section 76. The receiving section 92 of the coolant delivery passage 90 is in fluid communication with the coolant reservoir section 76 of the fastener bore 70.

Figure 5:
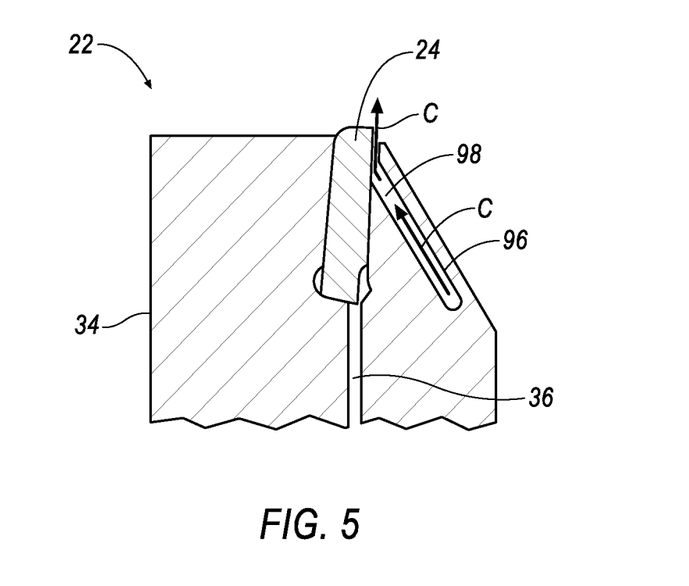
FIG. 5 is cross-sectional view of the head portion of the toolholder of FIG. 1 taken along section line 5-5 of FIG. 2.
Figure 6:
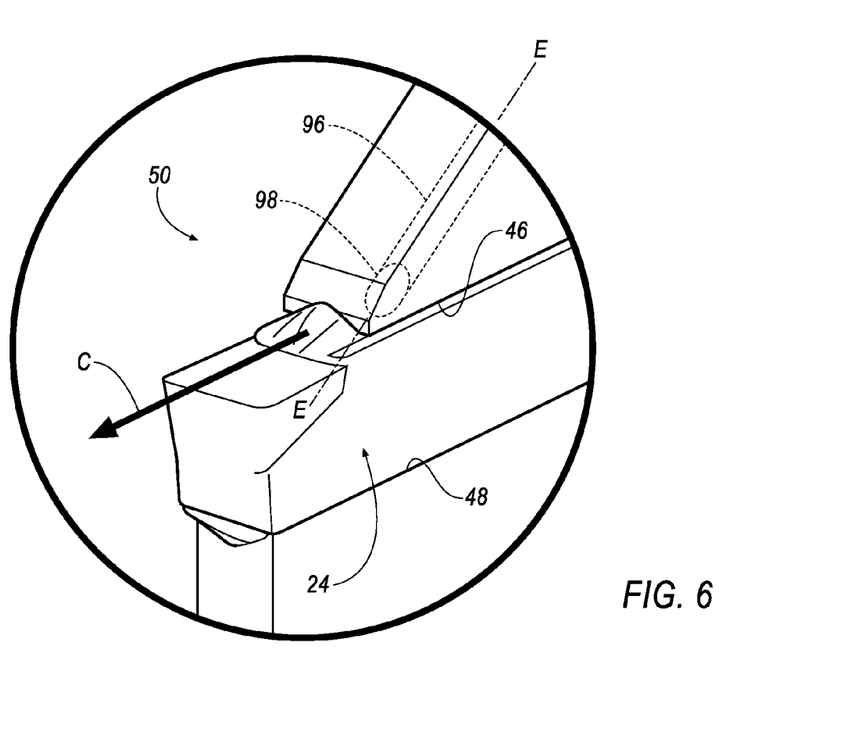
FIG. 6 is an enlarged view showing the flow of coolant through the toolholder and onto the cutting insert.

The coolant delivery passage 90 has a discharging section 96, which terminates at a discharge opening (or exit) 98, as shown in FIG. 5 (shown in phantom in FIG. 6). The discharging section 96 has a longitudinal coolant discharge axis E-E (see FIG. 6). The receiving section 92 is in fluid communication with the discharging section 96. Coolant discharges from the discharge opening 98 toward the cutting insert-workpiece interface from a position (or location) that is above the cutting insert-workpiece interface.

There should be an appreciation that the coolant discharges from the discharge opening 98 in a direction directly toward the cutting insert 24. Keeping in mind that the cutting insert 24 is elongate with a central longitudinal axis, the coolant discharges the discharge opening 98 in a direction generally aligned with the central longitudinal axis of the elongate cutting insert 24 throughout the entire cutting operation. As will be discussed hereinafter, certain advantages arise from the discharge of the coolant directly to the vicinity of the cutting insert-workpiece interface throughout the entire cutting operation.

The fastener bore 70 receives an elongate fastener 110 for serving the dual purpose of clamping the cutting insert 24 in the toolholder 22, while allowing the coolant 64 to pass therethrough. The fastener 110 has a top (one) axial end 112 and an opposite bottom (other) axial end 114. The fastener 110 has a head section 118 adjacent to the top axial end 112. The fastener 110 further has a threaded shank section 122, as well as a mediate section 120 between the head section 118 and the shank section 122. The fastener 110 has a seal groove 124 in the mediate section 120 and the seal groove 124 carries a resilient seal 126. The seal 126 creates a fluid-tight seal with the upper terminal bore section 80. The fastener 110 contains an axial fastener bore 130 which has an open end 132 adjacent the bottom end 114 of the fastener 110. The fastener 110 further contains a transverse fastener bore 136, which intersects the axial fastener bore 130, and has openings 138.

Referring to FIGS. 3-6, in operation, coolant under pressure from the coolant source 64 enters the coolant entrance passage 60 via the entrance opening 62. Coolant travels through the coolant entrance passage 60 and into the volume of the lower bore section 82. Coolant then passes into the axial fastener bore 130 via the open end 132 thereof. Coolant then travels up the axial fastener bore 130 and into the transverse fastener bore 136. Coolant exits the transverse fastener bore 136 at the openings 138 and into the coolant reservoir section 76. Coolant then enters into the receiving section 92 of the coolant delivery passage 90, and then into the discharging section 96 of the coolant delivery passage 90. Coolant, which is under pressure (see arrows "C" in FIGS. 5 and 6), then exits the discharge opening 98 in a direction toward the cutting insert 24.

Figure 8:
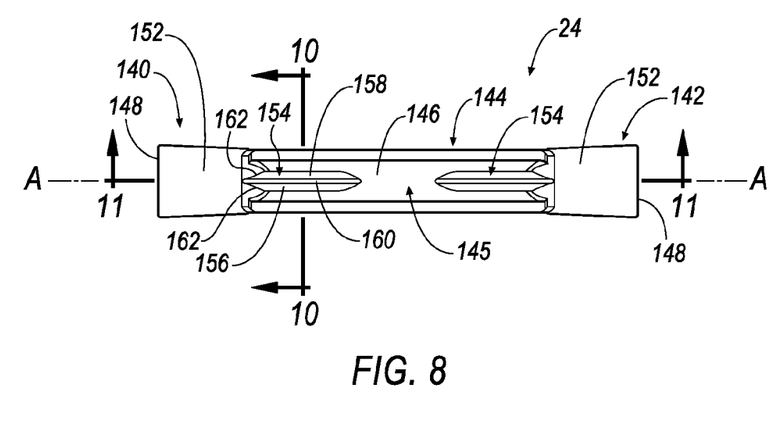
FIG. 8 is a top view of the cutting insert.
Figure 9:
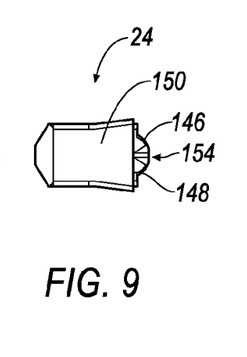
FIG. 9 is an end view of the cutting insert.
Figure 10:
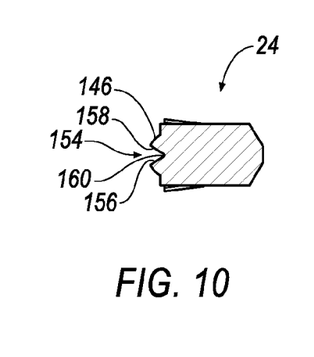
FIG. 10 is a cross-sectional view of the cutting insert of FIG. 7 taken along section line 10-10 of FIG. 8.

Referring to FIGS. 7-11, the cutting insert 24 includes a pair of cutting portions 140, 142 disposed on either side of a shank portion 144. During use, the shank portion 144 of the cutting insert 24 is clamped to the toolholder 22, as shown in FIG. 1, which locates and support one of the cutting portions 140, 142. When one of the cutting portions 140, 142 is worn, for example, the cutting portion 140, the cutting insert 24 is rotated 180° in the toolholder 22 in order to locate the other cutting portion 142 at the machining position. As shown in FIGS. 8 and 9, the cutting insert 24 includes a top surface 145 with an upwardly extending protuberance 146 that can be engaged by the toolholder 22 to rigidly mount the cutting insert 24 in its operative position.

In one embodiment, the cutting insert 24 is formed from a relatively hard material, such as carbide, cermet, ceramic, and the like. The cutting insert 24 can be molded using powder metal technology that is known in the art. However, the invention contemplates other methods and technologies for forming and making the cutting insert, as well as materials other than those identified above.

Figure 11:
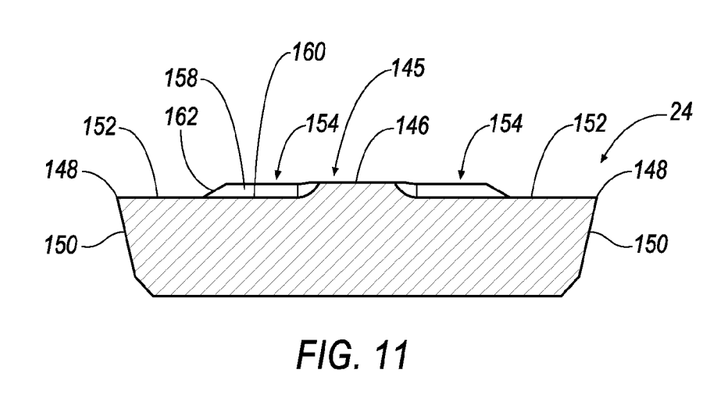
FIG. 11 is a cross-sectional view of the cutting insert of FIG. 7 taken along section line 11-11 of FIG. 8.

The cutting portions 140, 142 are substantially identical and, hence, only the cutting portion 140 will be described for brevity. The cutting portion 140 includes a forward cutting edge 148 and a clearance face 150 extending downwardly from the forward cutting edge, as shown in FIGS. 9 and 11. In the illustrated embodiment, the forward cutting edge 148 is oriented at a lead angle equal to 0 degrees. However, it should be appreciated that the invention is not limited by the magnitude of the lead angle, and that the invention can be practiced with any desirable lead angle, for example, a lead angle between 0 degrees and 10 degrees. A rake surface 152 extends rearwardly from the forward cutting edge 148, i.e., toward the shank portion 144, to the protrusion 146.

During the entire cutting operation, it is important to deliver coolant to the cutting insert-workpiece interface. By the nature of the cutting operation that forms a groove, as the cutting operation progresses the cutting insert, which has an elongate geometry with a central longitudinal axis perpendicular to the surface of the workpiece, moves deeper into the workpiece. Further, as the cutting operation progresses, the cutting insert-workpiece interface moves deeper into the mass of the workpiece. As a result, it becomes more difficult to deliver coolant from an external side nozzle to the cutting insert-workpiece interface because the workpiece itself blocks coolant from reaching the cutting insert-workpiece interface.

The problem of delivering coolant to the cutting insert-workpiece interface has been solved by the invention by providing a coolant channel, shown generally at 154, formed in the shank portion 144 of the cutting insert 24. In the illustrated embodiment, the coolant channel 154 is formed in the protuberance 146 on the top surface 145 of the cutting insert 24. However, it will be appreciated that the invention is not limited to the coolant channel formed in the protuberance, and that the invention can be practiced by providing a coolant channel in the top surface of a cutting insert that does not include the protuberance, so long as the coolant channel is substantially aligned with the discharge opening 98 of the toolholder 22.

In the illustrated embodiment, the coolant channel 154 is substantially V-shaped in cross section and is defined by a pair of side walls 156, 158 and a bottom surface 160 therebetween. However, it will be appreciated that the invention is not limited by the cross-sectional shape of the channel, and that the invention can be practiced with any desirable cross-sectional shape that provides the desired behavior characteristics of the coolant flow. For example, the channel 154 may be elliptical, oval, U-shaped, and the like, in cross section. The forward end of each side wall 156, 158 includes an angled surface 162 for facilitating the flow of coolant through the channel 154.

It is noted that the channel 154 is aligned with and parallel to the central longitudinal cutting insert axis A-A of the cutting insert 24, as shown in FIG. 8. It is also noted that the channel 154 is positioned directly opposite of the discharge opening 98 when mounted in the toolholder 22, as shown in FIG. 6. This feature causes the channel 154 to act as a nozzle to enhance the flow rate of the coolant that is delivered directly to the cutting insert-workpiece interface, and hence, the delivery of coolant has a higher level of efficiency. More coolant impinges the cutting insert-workpiece interface, thereby providing for more efficient cooling of the cutting insert-workpiece interface.

Overall, it is apparent from the above description in connection with the drawings that the cutting assembly delivers coolant in an efficient fashion to the vicinity of the interface between the cutting insert and the workpiece.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting assembly, comprising:
a toolholder and a cutting insert;
the toolholder having an axial forward end and an axial rearward end, the toolholder having a head portion at the axial forward end and a shank portion at the axial rearward end;
the head portion containing a slot separating the head portion into a lower section and an upper section, the lower section defining a lower seat and the upper section adapted to retain the cutting insert therebetween;
the head portion having an exit adapted to direct coolant to the cutting insert;
the head portion containing a fastener bore;
the head portion containing a coolant entrance passage in fluid communication with the fastener bore, and the upper axial forward extension section containing at least a portion of a coolant discharging section having a longitudinal coolant discharge axis;
a fastener being received within the fastener bore to clamp the cutting insert in the toolholder and allow coolant to pass therethrough, the fastener having an axial fastener bore with an inlet and an outlet, the axial fastener bore inlet being in fluid communication with the coolant entrance passage and the axial fastener bore outlet being in fluid communication with the fastener bore;
the cutting insert includes a pair of cutting portions disposed on either side of a shank portion, each cutting portion including a forward cutting edge and a clearance face extending downwardly from the forward cutting edge, the forward cutting edge being oriented at a lead angle of between 0 degrees and 10 degrees, the cutting insert further including a rake surface extending rearwardly from the forward cutting edge of each cutting portion toward the shank portion to a protuberance extending upwardly in the shank portion, the upwardly extending protuberance engaged by the toolholder to rigidly mount the cutting insert in the head portion of the toolholder, the cutting insert further including a coolant channel formed in the protuberance of the shank portion of the cutting insert adjacent each rake surface,
wherein the coolant channel is positioned directly opposite of the exit when the cutting insert is mounted in the toolholder, thereby causing the coolant channel to act as a nozzle to enhance the flow rate of the coolant delivered to an interface between the cutting insert and a workpiece.

2. The cutting assembly according to claim 1, wherein the coolant channel is formed in the protuberance on the top surface of the cutting insert.

3. The cutting assembly according to claim 1, wherein the coolant channel is V-shaped in cross section.

4. The cutting assembly according to claim 1, wherein the coolant channel is aligned with and parallel to a central longitudinal cutting insert axis of the cutting insert.

5. The cutting assembly according to claim 1, wherein the fastener further includes a transverse fastener bore intersecting the axial fastener bore.

6. The cutting assembly according to claim 5, wherein the fastener bore defines a coolant reservoir section, and the transverse fastener bore opening into the coolant reservoir section.

7. The cutter assembly according to claim 1, wherein the head portion comprises a narrow axial forward extension, at least a portion of the coolant delivery passage being in the narrow axial forward extension, and the exit being in the narrow axial forward extension.

8. A cutting assembly for removing material from a workpiece having a workpiece surface upon the cutting assembly engaging the workpiece at a cutting insert-workpiece interface, the assembly comprising:
a toolholder and an elongate cutting insert, the elongate cutting insert having a central longitudinal cutting insert axis wherein the central longitudinal cutting insert axis being generally perpendicular to the workpiece surface;
the toolholder having an axial forward end and an axial rearward end, the toolholder having a head portion at the axial forward end and a shank portion at the axial rearward end;
the head portion having a narrow axial forward extension with a central longitudinal extension axis, the head portion containing a slot separating the narrow axial forward extension into a lower axial forward extension section and an upper axial forward extension section wherein the upper axial forward extension section is movable relative to the lower axial forward extension section, and the lower axial forward extension section defining a lower seat and the upper axial forward extension section defining an upper seat wherein the lower seat and the upper seat being adapted to retain the elongate cutting insert therebetween such that the central longitudinal cutting insert axis being generally parallel with the central longitudinal extension axis;
the head portion containing a fastener bore;
the head portion containing a coolant entrance passage in fluid communication with the fastener bore, and the upper axial forward extension section containing at least a portion of a coolant discharging section having a longitudinal coolant discharge axis;
a fastener being received within the fastener bore to clamp the cutting insert in the toolholder and allow coolant to pass therethrough, the fastener having an axial fastener bore with an inlet and an outlet, the axial fastener bore inlet being in fluid communication with the coolant entrance passage and the axial fastener bore outlet being in fluid communication with the fastener bore;
the coolant discharging section being in fluid communication with the fastener bore, and the coolant discharging section having an exit in the upper axial forward extension section wherein the exit opens towards the cutting insert-workpiece interface so as to discharge coolant towards the cutting insert in a direction generally parallel to the central longitudinal cutting insert axis;
the cutting insert including a pair of cutting portions disposed on either side of a shank portion, each cutting portion including a forward cutting edge and a clearance face extending downwardly from the forward cutting edge, the forward cutting edge being oriented at a lead angle of between 0 degrees and 10 degrees, the cutting insert further including a rake surface extending rearwardly from the forward cutting edge toward the shank portion to a protuberance extending upwardly in the shank portion, the upwardly extending protuberance engaged by the toolholder to rigidly mount the cutting insert in the head portion of the toolholder, the cutting insert further including a coolant channel formed in the protuberance of the shank portion of the cutting insert adjacent each rake surface, wherein the coolant channel is positioned directly opposite of the exit when mounted in the toolholder, thereby causing the coolant channel to act as a nozzle to enhance the flow rate of the coolant delivered to an interface between the cutting insert and a workpiece.

9. The cutting assembly according to claim 8, wherein the coolant channel is formed in the protuberance on the top surface of the cutting insert.

10. The cutting assembly according to claim 8, wherein the coolant channel is V-shaped in cross section.

11. The cutting assembly according to claim 8, wherein the coolant channel is aligned with and parallel to a central longitudinal cutting insert axis of the cutting insert.

\* \* \* \* \*